(12) United States Patent
Matsumoto et al.

(10) Patent No.: US 11,886,842 B2
(45) Date of Patent: Jan. 30, 2024

(54) DEVELOPMENT ASSISTANCE DEVICE, DEVELOPMENT ASSISTANCE SYSTEM, AND DEVELOPMENT ASSISTANCE METHOD

(71) Applicant: Mitsubishi Electric Corporation, Tokyo (JP)

(72) Inventors: Takashi Matsumoto, Tokyo (JP); Genta Yoshimura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 301 days.

(21) Appl. No.: 17/347,817

(22) Filed: Jun. 15, 2021

(65) Prior Publication Data

US 2021/0311706 A1 Oct. 7, 2021

Related U.S. Application Data

(63) Continuation of application No. PCT/JP2019/002739, filed on Jan. 28, 2019.

(51) Int. Cl.
*G06F 8/34* (2018.01)
*G06N 20/00* (2019.01)
(Continued)

(52) U.S. Cl.
CPC .............. *G06F 8/34* (2013.01); *G06F 3/14* (2013.01); *G06N 3/09* (2023.01); *G06N 5/04* (2013.01);
(Continued)

(58) Field of Classification Search
CPC ..... G06F 8/34; G06F 8/30; G06F 8/38; G06F 3/14; G06N 20/00; G06N 5/04;
(Continued)

(56) References Cited

U.S. PATENT DOCUMENTS 6,126,600 A * 10/2000 Oxaal ................. G01S 15/8906
600/443
2003/0018955 A1 1/2003 Hayase et al.
(Continued)

FOREIGN PATENT DOCUMENTS

CN 106537420 A 3/2017
CN 108279899 A 7/2018
(Continued)

OTHER PUBLICATIONS

Title: From context to content: leveraging context to infer media metadata, author: M Davis, et al, published on 2004.*
(Continued)

*Primary Examiner* — Geoffrey R St Leger
(74) *Attorney, Agent, or Firm* — Birch, Stewart, Kolasch & Birch, LLP

(57) ABSTRACT

A development assistance device includes: multiple conversion units each converting either an inputted signal value or inputted meta information into either a signal value or meta information, and outputting either the signal value after conversion or the meta information after conversion as output information; a pipeline unit causing, on the basis of pipeline information showing a relationship of mutual connections between the multiple conversion units, the multiple conversion units to sequentially perform the corresponding converting processes; an inference unit making an inference by using the output information outputted by a final conversion unit which the pipeline unit causes, on the basis of the pipeline information, to finally perform the converting process, out of the multiple conversion units; and an image generation unit generating image information for visualizing the connection relationship shown by the pipeline information, and a relationship of a connection between the final conversion unit and the inference unit.

14 Claims, 9 Drawing Sheets

(51) Int. Cl.
  *G06F 3/14*  (2006.01)
  *G06N 5/04*  (2023.01)
  *G06T 11/20* (2006.01)
  *G06N 3/09*  (2023.01)
  *G06N 7/01*  (2023.01)
(52) U.S. Cl.
  CPC .............. *G06N 7/01* (2023.01); *G06N 20/00* (2019.01); *G06T 11/206* (2013.01)
(58) Field of Classification Search
  CPC ............ G06N 5/01; G06N 7/01; G06N 3/006; G06N 3/126; G06T 11/206; G06T 2200/24
  USPC ......................................................... 717/109
  See application file for complete search history.

(56) References Cited

U.S. PATENT DOCUMENTS

| | | | |
|---|---|---|---|
| 2016/0034810 A1 | 2/2016 | Hershey et al. | |
| 2016/0283515 A1* | 9/2016 | Moussalli | G01S 19/13 |
| 2017/0351401 A1* | 12/2017 | Pascale | G06N 20/00 |
| 2019/0114155 A1 | 4/2019 | Hong | |
| 2019/0332970 A1 | 10/2019 | Lei et al. | |
| 2019/0394083 A1* | 12/2019 | Sglavo | G06F 11/1448 |
| 2023/0007343 A1* | 1/2023 | Daly | H04N 21/41407 |

FOREIGN PATENT DOCUMENTS

| | | |
|---|---|---|
| CN | 109271581 A | 1/2019 |
| JP | 2003-15869 A | 1/2003 |
| JP | 2015-167041 A | 9/2015 |
| JP | 5918368 B2 | 5/2016 |
| JP | 6007430 B2 | 10/2016 |
| WO | WO 2017/217644 A2 | 12/2017 |

OTHER PUBLICATIONS

Title: A data-driven meta-data inference framework for building automation systems, author: J Gao et al, published on 2015.*
Patel, Kayur, et al., Gestalt: Integrated Support for Implementation and Analysis in Machine Learning, UIST '10: Proceedings of the 23nd annual ACM symposium on User interface software and technology, Oct. 2010, 10 pages, [retrieved on Oct. 3, 2023], Retrieved from the Internet: <URL:http://dl.acm.org/>.*
German Office Action for German Application No. 112019006397.9, dated Mar. 17, 2022, with English translation.
Taiwanese Office Action and Search Report for Taiwanese Application No. 108125803, dated Oct. 20, 2021, with an English translation.
Indian Office Action for Indian Application No. 202147026994, dated May 17, 2022, with English translation.

* cited by examiner

DEVELOPMENT ASSISTANCE DEVICE, DEVELOPMENT ASSISTANCE SYSTEM, AND DEVELOPMENT ASSISTANCE METHOD

CROSS REFERENCE TO RELATED APPLICATIONS

This application is a Continuation of PCT International Application No. PCT/JP2019/002739 filed on Jan. 28, 2019, which is hereby expressly incorporated by reference into the present application.

TECHNICAL FIELD

The present invention relates to a development assistance device, a development assistance system, and a development assistance method.

BACKGROUND ART

There are integrated development environments that assist development or design of software programs by using a graphical user interface (GUI).

For example, in Patent Literature 1, a machine learning model design assistance device that displays a directed graph made up of function nodes and directed edges on a display unit, and that enables an edit of the directed graph through the GUI is disclosed.

CITATION LIST

Patent Literature

Patent Literature 1: Japanese Patent No. 6007430

SUMMARY OF INVENTION

Technical Problem

Information inputted to an inference model such as a machine learning model is a signal value or meta information. Usually, a signal value and meta information can be acquired by performing preprocessing including various types of converting processes on data prepared in advance (referred to as "original data" hereinafter). A signal value is information showing a value detected by a sensor or the like. Meta information is supplementary information regarding certain information.

What type of signal value or meta information is set as information to be inputted to the inference model is one of important design factors in the design of the inference model. However, conventional design assistance devices like the machine learning model design assistance device disclosed in, for example, Patent Literature 1 do not take the design of information to be inputted to the inference model into consideration. Therefore, a problem with conventional design assistance devices is that it is impossible to provide assistance for the design of an inference model, the assistance also including the design of information to be inputted to the inference model.

The present invention is made in order to solve the above-mentioned problem, and it is therefore an object of the present invention to provide a development assistance device that can perform visualization of preprocessing on original data.

Solution to Problem

A development assistance device according to the present invention includes: multiple pieces of conversion processing circuitry each to convert an inputted signal value into either a different signal value or meta information or convert inputted meta information into either a signal value or different meta information, and to output either the signal value after conversion or the meta information after conversion as output information; pipeline processing circuitry to cause, on the basis of pipeline information showing a relationship of mutual connections between the multiple pieces of conversion processing circuitry, the multiple pieces of conversion processing circuitry to sequentially perform corresponding converting processes; inference processing circuitry to make an inference by using the output information outputted by one or more pieces of final conversion processing circuitry which the pipeline processing circuitry causes, on the basis of the pipeline information, to finally perform corresponding converting processes, out of the multiple pieces of conversion processing circuitry, and to output inference information showing a result of the inference; image generation processing circuitry to generate image information for visualizing the relationship of the mutual connections between the multiple pieces of conversion processing circuitry, the relationship being shown by the pipeline information, and a relationship of a connection between the one or more pieces of final conversion processing circuitry and the inference processing circuitry; and output control processing circuitry to output the image information generated by the image generation processing circuitry.

Advantageous Effects of Invention

According to the present invention, it is possible to perform visualization of preprocessing on the original data. Therefore, it is possible to perform assistance for the development or the design of an inference model also including the design of information to be inputted to the inference model.

BRIEF DESCRIPTION OF DRAWINGS

FIG. 6 is a diagram showing an example of the image which is shown by the image information generated by the image generation unit according to Embodiment 1, and in which the output information outputted by a user-selected one of multiple conversion units is visualized using a distribution, a waveform, or the like;

DESCRIPTION OF EMBODIMENTS

Hereafter, an embodiment of the present invention will be explained in detail with reference to the drawings.

Embodiment 1

Figure 1:
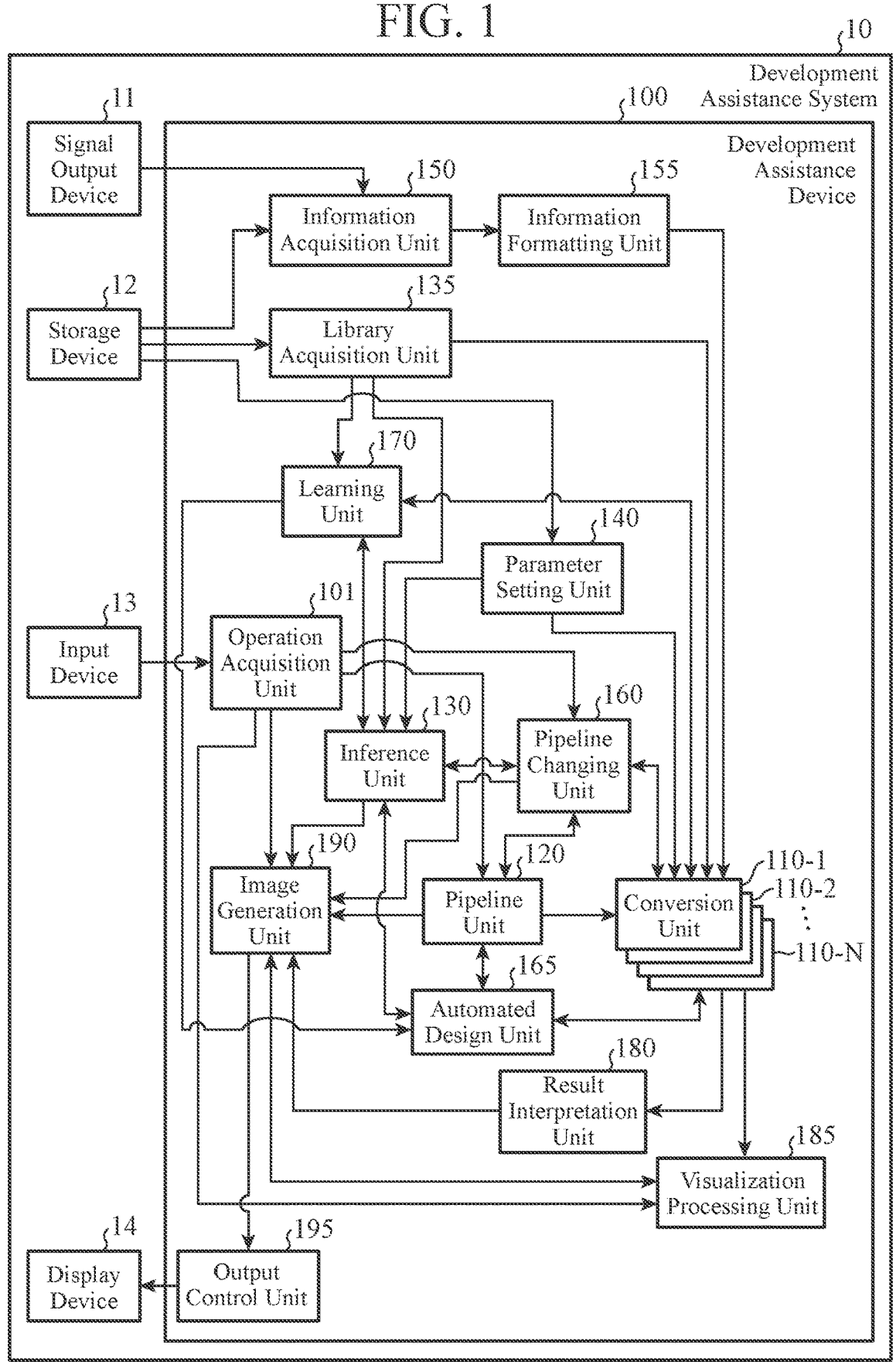
FIG. 1 is a block diagram showing an example of the configuration of a development assistance device according to Embodiment 1.

Referring to FIG. 1, the configuration of a main part of a development assistance device 100 according to Embodiment 1 will be explained.

FIG. 1 is a block diagram showing an example of the configuration of the development assistance device 100 according to Embodiment 1.

As shown in FIG. 1, the development assistance device 100 is used in a development assistance system 10.

The development assistance system 10 includes a signal output device 11, a storage device 12, an input device 13, a display device 14, and the development assistance device 100.

The signal output device 11 performs digital conversion on an electric signal, such as a sensor signal, an image signal, an electromagnetic wave signal, or an electromagnetic wave image signal, which is acquired from a sensor (not illustrated), an antenna (not illustrated), or the like, and outputs a digital signal after conversion to an outside.

In Embodiment 1, an explanation will be made assuming that the development assistance device 100 acquires, as a signal value (referred to as an "original signal value" hereinafter), the digital signal which the signal output device 11 outputs on the basis of the electric signal acquired from a sensor, an antenna, or the like.

The storage device 12 stores various pieces of information which the development assistance device 100 needs when a user, such as a developer or a designer, develops or designs a software program by using the development assistance device 100. For example, the storage device 12 has a nonvolatile storage medium, such as a hard disk drive or an SD card memory, and outputs information to the outside by reading the information stored in the nonvolatile storage medium.

In Embodiment 1, an explanation will be made assuming that the development assistance device 100 acquires necessary information as needed by reading the information from the storage device 12.

Pieces of information which the storage device 12 stores will be mentioned later.

The input device 13 receives input from a user and outputs operation information showing a description of the received input. The input device 13 includes a keyboard, a mouse, a touchpad, a touch sensor disposed on the display screen of the display device 14, or the like.

The development assistance device 100 acquires, from the input device 13, the operation information showing the description of the input which the input device 13 receives from the user.

The display device 14 displays acquired image information. The display device 14 includes a liquid crystal display or the like.

The development assistance device 100 outputs image information to the display device 14, and causes the display device 14 to display an image shown by the outputted image information.

The development assistance device 100 includes an operation acquisition unit 101, multiple conversion units 110-1, 110-2, . . . , and 110-N (N is a natural number equal to or greater than 2), a pipeline unit 120, an inference unit 130, a library acquisition unit 135, a parameter setting unit 140, an information acquisition unit 150, an information formatting unit 155, a pipeline changing unit 160, an image generation unit 190, and an output control unit 195.

The development assistance device 100 may include an automated design unit 165, a learning unit 170, a result interpretation unit 180, and a visualization processing unit 185, in addition to the above-mentioned components.

The operation acquisition unit 101 acquires the operation information outputted by the input device 13.

Each of the multiple conversion units 110-1, 110-2, . . . , and 110-N converts an inputted signal value into another signal value or meta information or converts inputted meta information into a signal value or other meta information, and outputs either the signal value or the meta information after conversion as output information.

The signal value inputted to each of the multiple conversion units 110-1, 110-2, . . . , and 110-N, and the meta information inputted to each of the multiple conversion units 110-1, 110-2, . . . , and 110-N are generically called the "input data" hereinafter.

The signal value is information showing a value detected by a sensor or the like. The signal value may be provided by a time sequence signal in which its signal value varies with time.

The signal value inputted to each of the multiple conversion units 110-1, 110-2, . . . , and 110-N includes an original signal value, a signal value which the information formatting unit 155 generates by formatting the original signal value, or a signal value into which the input data is converted by each of the multiple conversion units 110-1, 110-2, . . . , and 110-N.

Concretely, for example, the signal value is a time sequence signal into which the signal value of a time sequence signal inputted to each of the multiple conversion units 110-1, 110-2, . . . , and 110-N is converted so as to be a difference value of the signal at each time.

The meta information is supplementary information regarding certain information. For example, the meta information is a summary statistic, such as a standard deviation, an average, a maximum, a minimum, or a population parameter in the signal value. For example, the meta information is flag information showing whether or not it is learning data, verification data, or the like in the signal value. For example, in the case in which the signal value shows an image, the meta information is classification class information showing the classification of an object seen in the image. For example, the meta information is flag information showing whether the signal value is normal or abnormal. The meta information may be statistical information whose description shown by the meta information varies with time, such as demographic statistics, household annual income statistics, or house price statistics.

The meta information inputted to each of the multiple conversion units 110-1, 110-2, . . . , and 110-N includes meta information acquired from the storage device 12, meta information which the information formatting unit 155 generates by formatting the acquired meta information, or meta information into which the input data is converted by each of the multiple conversion units 110-1, 110-2, . . . , and 110-N.

Concretely, for example, the meta information is classification class information showing the classification of an average which is the meta information inputted to each of the multiple conversion units 110-1, 110-2, . . . , and 110-N, the average being converted in such a way that a distinction about whether or not the average is larger than a predetermined value can be made.

Further, concretely, for example, the signal value is a time sequence signal in which flag information showing whether or not it is learning data is added to time-series data, the flag information being the meta information inputted to each of the multiple conversion units 110-1, 110-2, . . . , and 110-N.

The converting process which each of the multiple conversion units 110-1, 110-2, . . . , and 110-N performs is a smoothing process, a standardization process, a moving average calculation process, a short-time Fourier transform process, an average calculation process, a minimum extraction process, a maximum extraction process, a standard deviation calculation process, a population parameter calculation process, or the like.

The pipeline unit 120 causes, on the basis of pipeline information showing a relationship of mutual connections between the multiple conversion units 110-1, 110-2, . . . , and 110-N, the multiple conversion units 110-1, 110-2, . . . , and 110-N to sequentially perform the corresponding converting processes.

For example, in the case in which the development assistance device 100 includes the conversion unit 110-1 and the conversion unit 110-2, and a connection is made in such a way that following the converting process by the conversion unit 110-1, the converting process by the conversion unit 110-2 is performed, the output information outputted by the conversion unit 110-1 is inputted as data inputted to the conversion unit 110-2.

The inference unit 130 performs an inference process by using the output information outputted by one or more conversion units, and outputs inference information showing a result of the inference, where the pipeline unit 120 causes, on the basis of the pipeline information, the one or more conversion units out of the multiple conversion units 110-1, 110-2, . . . , and 110-N to finally perform the corresponding converting processes (the one or more conversion units being referred to as the "final conversion units 110-L1, 110-L2, . . . , and 110-Lm hereinafter (each of L1, L2, . . . , and Lm is a natural number equal to or greater than 1 and equal to or less than N)").

The inference unit 130 performs the inference process, such as machine learning or data mining, on the basis of the output information outputted by the one or more final conversion units 110-L1, 110-L2, . . . , and 110-Lm, using Generalizer Linear Model, Random Forest, Gradient Boosted Decision Tree, Generalized Additive Model, or the like.

The library acquisition unit 135 acquires a software program, such as a smoothing process, which corresponds to the converting process performed by each of the multiple conversion units 110-1, 110-2, . . . , and 110-N from a software library stored in the storage device 12.

Each of the multiple conversion units 110-1, 110-2, . . . , and 110-N performs the converting process by executing the software program acquired by the library acquisition unit 135.

The library acquisition unit 135 also acquires, from the software library stored in the storage device 12, a software program, such as Generalizer Linear Model, which the inference unit 130 uses when performing the inference process.

The inference unit 130 performs the inference process by using the software program acquired by the library acquisition unit 135.

The parameter setting unit 140 sets, to each of the multiple conversion units 110-1, 110-2, . . . , and 110-N, a parameter which each of the multiple conversion units 110-1, 110-2, . . . , and 110-N needs when performing the converting process.

The parameter setting unit 140 also sets, to the inference unit 130, a parameter which the inference unit 130 needs when performing the inference process.

The parameter setting unit 140 acquires the parameters which the parameter setting unit 140 sets, by reading the parameters stored in the storage device 12 from the storage device 12. The parameter setting unit 140 may hold, in advance, the parameters which the parameter setting unit 140 sets.

In the case in which each of the multiple conversion units 110-1, 110-2, . . . , and 110-N performs the converting process by using a machine learning model or the inference unit 130 performs the inference process by using a machine learning model, the parameter setting unit 140 may set a hyper-parameter as the parameter.

The information acquisition unit 150 acquires, as an original signal value, the digital signal outputted by the signal output device 11. The information acquisition unit 150 may acquire an electric signal from a sensor, an antenna, or the like as above and convert the acquired electric signal into a digital signal, thereby acquiring an original signal value.

The information acquisition unit 150 acquires meta information from the storage device 12, in addition to an original signal value.

The information formatting unit 155 formats either the signal value or the meta information which is acquired by the information acquisition unit 150, into a form in which either the signal value or the meta information can be inputted, as input data, to one or more conversion units, where the one or more conversion units out of the multiple conversion units 110-1, 110-2, . . . , and 110-N are caused, on the basis of the pipeline information, to first perform the corresponding converting processes (the one or more conversion units being referred to as the "initial conversion units 110-S1, 110-S2, . . . , and 110-Sn hereinafter (each of S1, S2, . . . , and Sn is a natural number equal to or greater than 1 and equal to or less than N)").

The image generation unit 190 generates image information visualizing both the relationship of mutual connections between the multiple conversion units 110-1, 110-2, . . . , and 110-N (referred to as the "conversion unit connection relationship" hereinafter), the connection relationship being shown by the pipeline information, and a relationship of a connection between the one or more final conversion units 110-L1, 110-L2, . . . and 110-Lm and the inference unit 130 (referred to as the "inference unit connection relationship" hereinafter).

The conversion unit connection relationship is shown, in the image shown by the image information, by, for example, one or more input data images, conversion unit images, output information images, an output line image, and an input line image, which will be explained below.

The input data image shows the input data inputted to each of the one or more initial conversion units 110-S1, 110-S2, . . . , and 110-Sn.

The conversion unit images are multiple images 111-1, 111-2, . . . , and 111-N showing respectively the multiple conversion units 110-1, 110-2, . . . , and 110-N.

The output information images are multiple images 112-1, 112-2, . . . , and 112-N showing pieces of output information outputted by the respective multiple conversion units 110-1, 110-2, . . . , and 110-N shown respectively by the multiple conversion unit images 111-1, 111-2, . . . , and 111-N.

The output line image shows that the multiple conversion units 110-1, 110-2, . . . , and 110-N shown respectively by the multiple conversion unit images 111-1, 111-2, . . . , and 111-N output the respective pieces of output information shown by the multiple output information images 112-1, 112-2, . . . , and 112-N, and is shown by arrow lines connecting the multiple conversion unit images 111-1, 111-2, . . . , and 111-N and the respective multiple output information images 112-1, 112-2, . . . and 112-N.

The input line image shows that the multiple pieces of output information shown by the respective multiple output information images 112-1, 112-2, . . . , and 112-N are inputted, as the pieces of input data, to the multiple conversion units 110-1, 110-2, . . . , and 110-N shown by the conversion unit images 111-1, 111-2, . . . , and 111-N, and is shown by arrow lines connecting the output information images 112-1, 112-2, . . . , and 112-N and the conversion unit images 111-1, 111-2, . . . and 111-N.

The inference unit connection relationship is shown, in the image shown by the image information, by, for example, an inference unit image and an inference unit input line image which will be explained below.

The inference unit image includes conversion unit images 111-L1, 111-L2, . . . , and 111-Lm showing the one or more final conversion units 110-L1, 110-L2, . . . , and 110-Lm, and an image showing the inference unit 130.

The inference unit input line image is shown by the one or more output information images 112-L1, 112-L2, . . . , and 112-Lm showing the respective pieces of output information outputted by the one or more final conversion units 110-L1, 110-L2, . . . , and 110-Lm, and by one or more arrow lines connecting the output information images 112-L1, 112-L2, . . . , and 112-Lm and the inference unit image, the arrow lines showing that the pieces of output information shown by the respective one or more output information images 112-L1, 112-L2, . . . , and 112-Lm are inputted to the inference unit 130 shown by the inference unit image.

The output control unit 195 outputs the image information generated by the image generation unit 190.

Concretely, the output control unit 195 outputs the image information generated by the image generation unit 190 to the display device 14, and causes the display device 14 to display the image shown by the outputted image information.

Figure 2A:
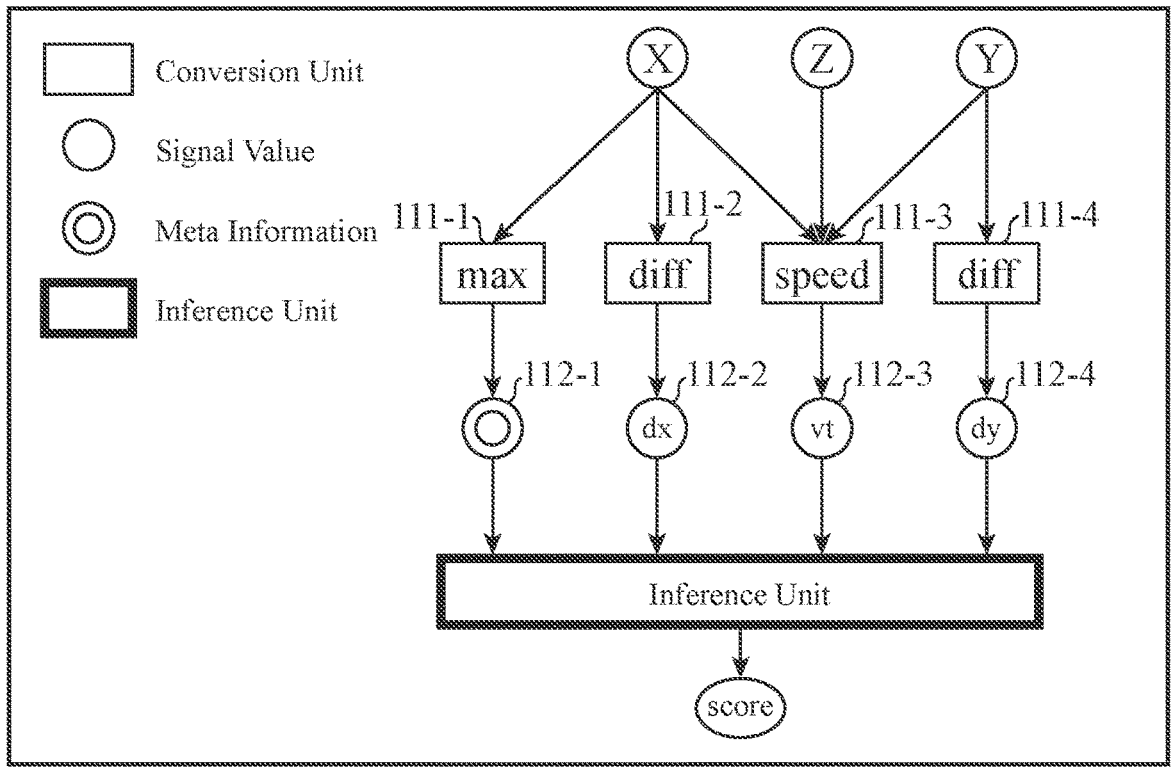
FIGS. 2A and 2B are diagrams each showing an example of an image shown by image information generated by an image generation unit according to Embodiment 1.
Figure 2B:
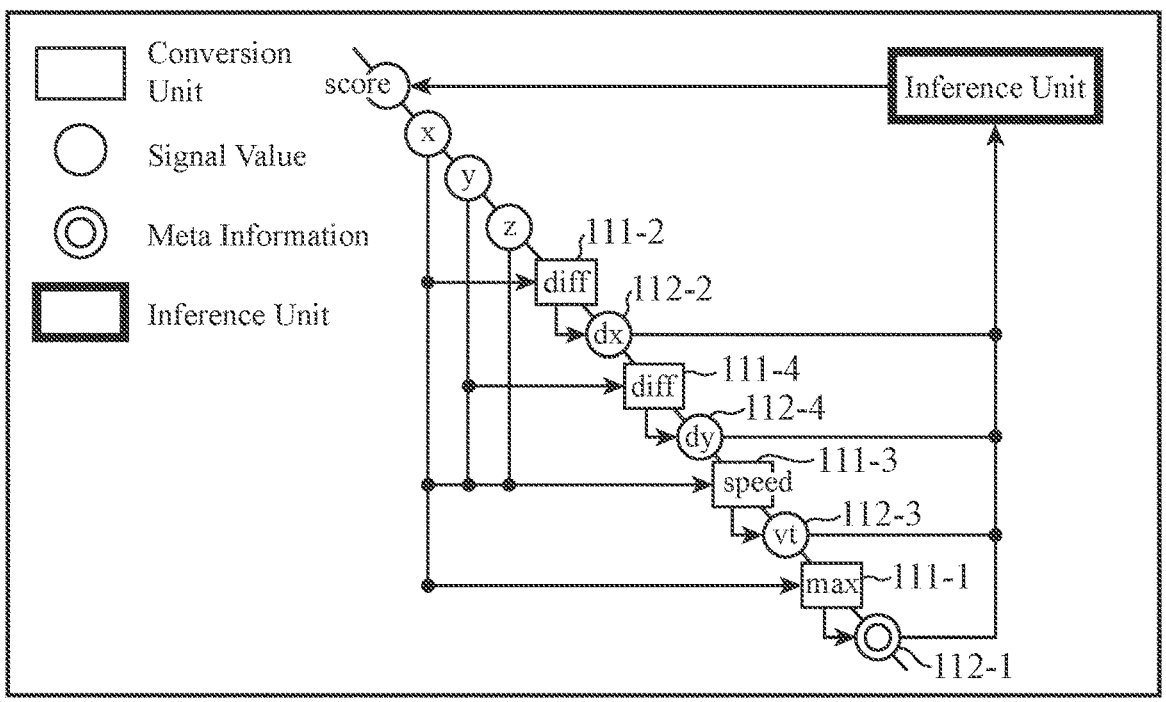

FIGS. 2A and 2B are diagrams each showing an example of the image shown by the image information generated by the image generation unit 190 according to Embodiment 1.

Each of FIGS. 2A and 2B shows, as an example, a certain conversion unit connection relationship and a certain inference unit connection relationship when a time sequence signal showing the three-dimensional position of an object which is a target to be observed (referred to as an "object" hereinafter), the three-dimensional position being shown by a position in an X direction, a position in a Y direction, and a position in a Z-direction, is acquired from the signal output device 11.

The development assistance device 100 visualizes the multiple conversion units 110-1, 110-2, . . . , and 110-N included in the software program which the user develops or designs, using the image shown by the image information.

In FIGS. 2A and 2B, the four conversion unit images 111-1, 111-2, 111-3, and 111-4 in the image shown by the image information generated by the image generation unit 190 show respectively the four conversion units 110-1, 110-2, 110-3, and 110-4 included in the software program.

Further, in FIGS. 2A and 2B, the four output information images 112-1, 112-2, 112-3, and 112-4 in the image shown by the image information generated by the image generation unit 190 show the respective pieces of output information outputted by the four conversion units 110-1, 110-2, 110-3, and 110-4 included in the software program.

The following points can be seen from FIGS. 2A and 2B.

The conversion unit 110-1 performs a process of extracting a maximum of a time sequence signal, as the converting process. The conversion unit 110-1 receives a time sequence signal inputted as an original signal value and showing the position of an object in the X direction, the position being acquired from the signal output device 11, extracts a maximum in the time sequence signal, and outputs the maximum as meta information. The conversion unit 110-2 performs a process of calculating a difference of the time sequence signal, as the converting process. The conversion unit 110-2 receives the time sequence signal inputted as an original signal value and showing the position of the object in the X direction, the position being acquired from the signal output device 11, calculates the difference between the position of the object in the X direction at a certain time in the time sequence signal and the position of the object in the X direction at a time different from the certain time, and outputs the calculated difference as a signal value. The conversion unit 110-3 performs a speed calculation process, as the converting process. The conversion unit 110-3 receives a time sequence signal inputted as an original signal value and showing the positions of the object in the X direction, in the Y direction, and in the Z-direction, the positions being acquired from the signal output device 11, calculates the speed of the object, and outputs the calculated speed as a signal value. The conversion unit 110-4 performs a process of calculating a difference of a time sequence signal, as the converting process. The conversion unit 110-2 receives a time sequence signal inputted as an original signal value and showing the position of the object in the Y direction, the position being acquired from the signal output device 11, calculates the difference between the position of the object in the Y direction at a certain time in the time sequence signal and the position of the object in the Y direction at a time different from the certain time, and outputs the calculated difference as a signal value.

The inference unit 130 receives the meta information and the signal values outputted from the conversion units 110-1, 110-2, 110-3, and 110-4, performs the inference process on the basis of the inputted meta information and the inputted signal values, and outputs a score as inference information. For example, the score is a value showing a processing result when the inference unit 130 deals with a regression problem, a numerical value, such as a SoftMax value, showing the likelihood of each class when the inference unit 130 deals with an identification problem, a value showing a cluster when the inference unit 130 performs clustering processing, a value showing a degree provided by each basis vector or the like when the inference unit 130 performs matrix factorization, or a value showing an abnormality degree when the inference unit 130 performs abnormality detection.

The image generation unit 190 may select one piece of image information to be generated, from multiple pieces of image information showing images illustrated in FIG. 2A or 2B on the basis of the operation information acquired by the operation acquisition unit 101, and generate the selected image information.

The images shown in FIG. 2A or 2B and shown by the pieces of image information generated by the image generation unit 190 are examples and are not limited to these examples.

The image generation unit 190 generates image information in such a way as to change either the conversion unit connection relationship or the inference unit connection relationship in the image shown by the image information on the basis of the operation information acquired by the operation acquisition unit 101.

Concretely, for example, the operation shown by the operation information acquired by the operation acquisition unit 101 is a user's operation of changing either the conversion unit connection relationship or the inference unit connection relationship while referring to the image displayed on the display device 14 and showing the conversion unit connection relationship and the inference unit connection relationship.

More concretely, for example, the user moves an image having the shape of an arrow (referred to as a "pointer" hereinafter), the image being superimposed on the image displayed on the display device 14, using the input device 13 such as a mouse, selects the conversion unit image 111-1, 111-2, ..., or 111-N, the output information image 112-1, 112-2, ..., or 112-N, an inference unit image, an output line image, an input line image, an inference unit input line image, or the like, which is included in the image displayed on the display device 14, and moves the selected image on the image displayed on the display device 14. The image generation unit 190 generates image information in such a way as to change either the conversion unit connection relationship or the inference unit connection relationship in the image shown by the image information on the basis of the operation information showing the user's operation mentioned above. The operation of changing either the conversion unit connection relationship or the inference unit connection relationship in the image shown by the image information, the operation being shown by the operation information, also includes an operation for performing addition or deletion of a conversion unit image, an input line image, an inference unit input line image, or the like.

The pipeline changing unit 160 changes either the conversion unit connection relationship or the inference unit connection relationship on the basis of the operation information acquired by the operation acquisition unit 101.

More concretely, the pipeline changing unit 160 changes either the conversion unit connection relationship or the inference unit connection relationship on the basis of the operation information acquired by the operation acquisition unit 101, to make it possible for the pipeline unit 120 to cause, on the basis of the changed pipeline information, the multiple conversion units 110-1, 110-2, ..., and 110-N to sequentially perform the corresponding converting processes.

The learning unit 170 learns an inference model, such as a machine learning model, which the inference unit 130 uses. The learning unit 170 performs learning processing in machine learning, such as supervised learning like a class classification or regression learning, or unsupervised learning like a cluster analysis or reinforcement learning, and generates or updates model information showing the inference model such as a machine learning model. The learning unit 170 performs the learning when the inference unit 130 performs the process by using the inference model such as a machine learning model.

The result interpretation unit 180 interprets the output information outputted by each of the one or more final conversion units 110-L1, 110-L2, ..., and 110-Lm, processes the output information into information in a predetermined form, and outputs the information after process as information used for design. Concretely, in order to make it possible for the user to infer why the inference unit 130 has made an inference to provide an inference result shown by the inference information by performing the inference process by using the output information outputted by each of the one or more final conversion units 110-L1, 110-L2, ..., and 110-Lm, the result interpretation unit 180 interprets the output information outputted by each of the one or more final conversion units 110-L1, 110-L2, ..., and 110-Lm, and outputs information used for design. More concretely, as to the output information outputted by each of the one or more final conversion units 110-L1, 110-L2, ..., and 110-Lm, the result interpretation unit 180 outputs information used for design for visualizing the degree of influence on the inference in the inference unit 130, by interpreting the output information outputted by each of the one or more final conversion units 110-L1, 110-L2, ..., and 110-Lm.

For example, in the case in which the inference unit 130 makes an inference by using a supervised learning model, the result interpretation unit 180 interprets the output information outputted by each of the one or more final conversion units 110-L1, 110-L2, ..., and 110-Lm connected to the inference unit 130, calculates the significance degree of the feature quantity which is the degree of influence on the inference in the inference unit 130, and outputs the calculated significance degree of the feature quantity as information used for design.

Further, for example, in the case in which the inference unit 130 makes an inference by using a probability model, the result interpretation unit 180 interprets the output information outputted by each of the one or more final conversion units 110-L1, 110-L2, ..., and 110-Lm connected to the inference unit 130, calculates a parameter in the probability model, and outputs the calculated parameter in the probability model as information used for design.

Further, for example, in the case in which the inference unit 130 makes an inference by using a matrix analytic model, the result interpretation unit 180 interprets the output information outputted by each of the one or more final conversion units 110-L1, 110-L2, ..., and 110-Lm connected to the inference unit 130, calculates a basis vector, and outputs the calculated basis vector as information used for design.

The image generation unit 190 generates image information for, in addition to visualizing the conversion unit connection relationship and the inference unit connection relationship, visualizing the information used for design outputted by the result interpretation unit 180.

Figure 3A:
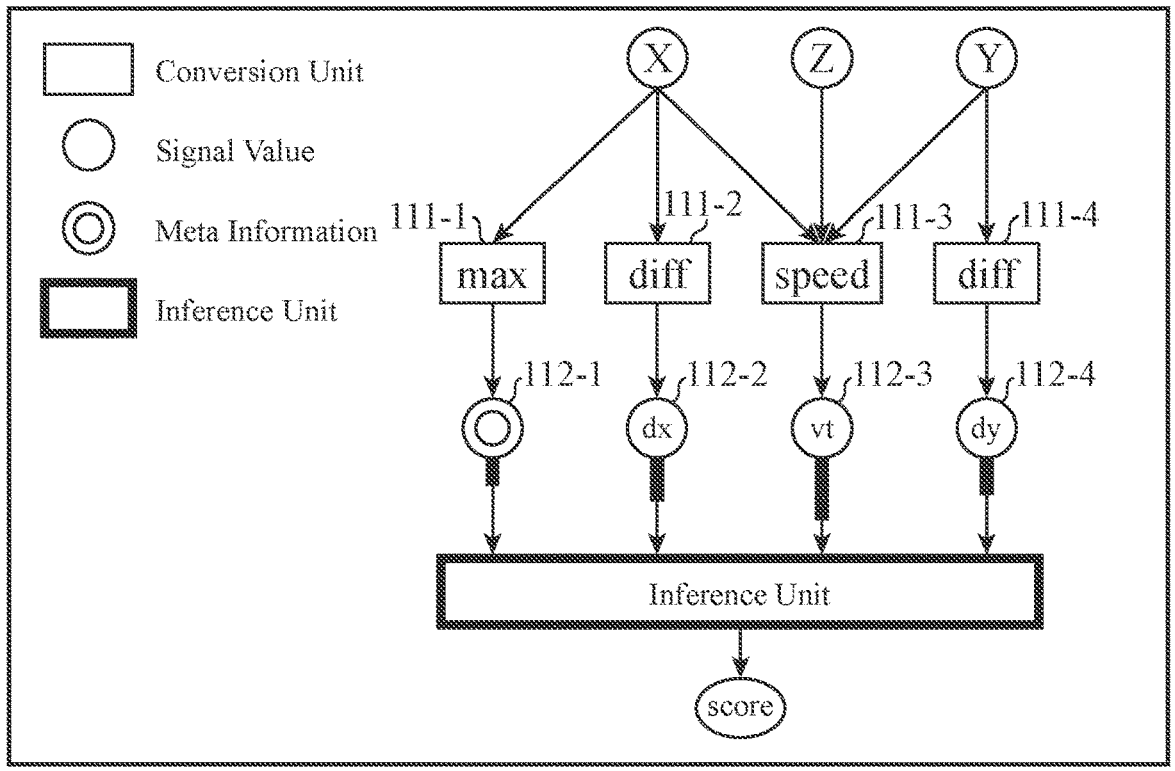
FIGS. 3A and 3B are diagrams each showing an example of the image shown by the image information generated by the image generation unit according to Embodiment 1.
Figure 3B:
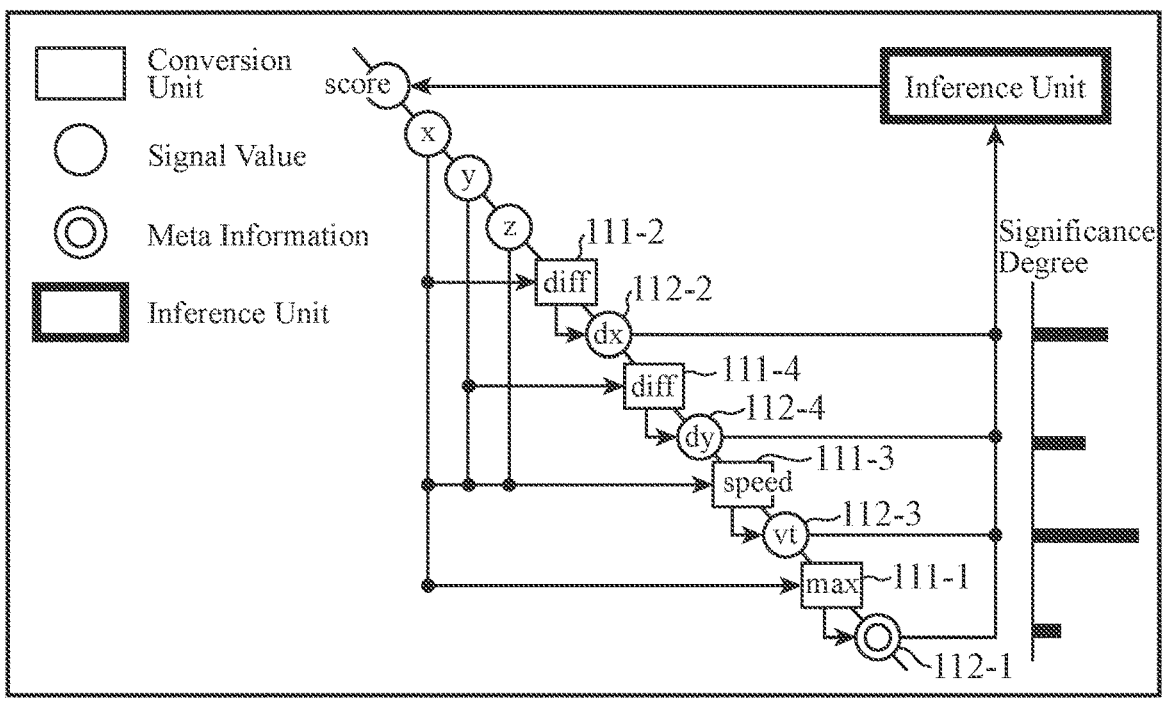

FIGS. 3A and 3B are diagrams each showing an example of the image shown by the image information which the image generation unit 190 generates in the case in which the inference unit 130 according to Embodiment 1 makes an inference by using the supervised learning model.

Figure 4:
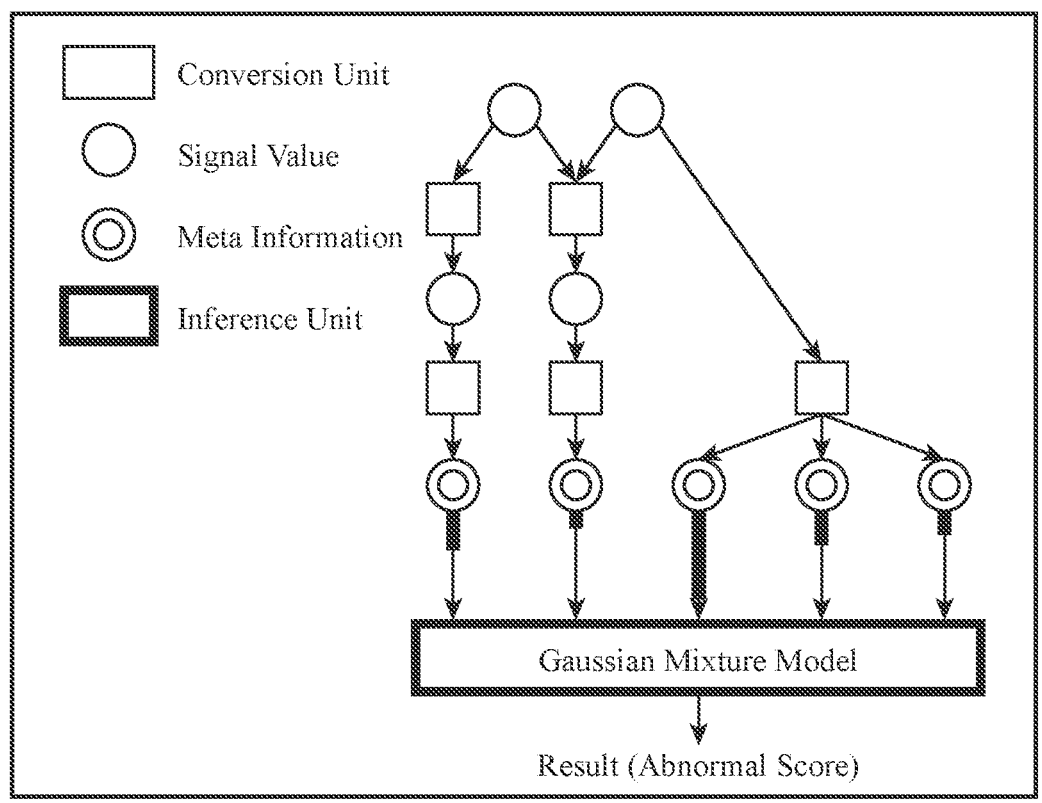
FIG. 4 is a diagram showing an example of the image shown by the image information generated by the image generation unit according to Embodiment 1.

FIG. 4 is a diagram showing an example of the image shown by the image information which the image generation unit 190 generates in the case in which the inference unit 130 makes an inference by using the probability model.

Figure 5A:
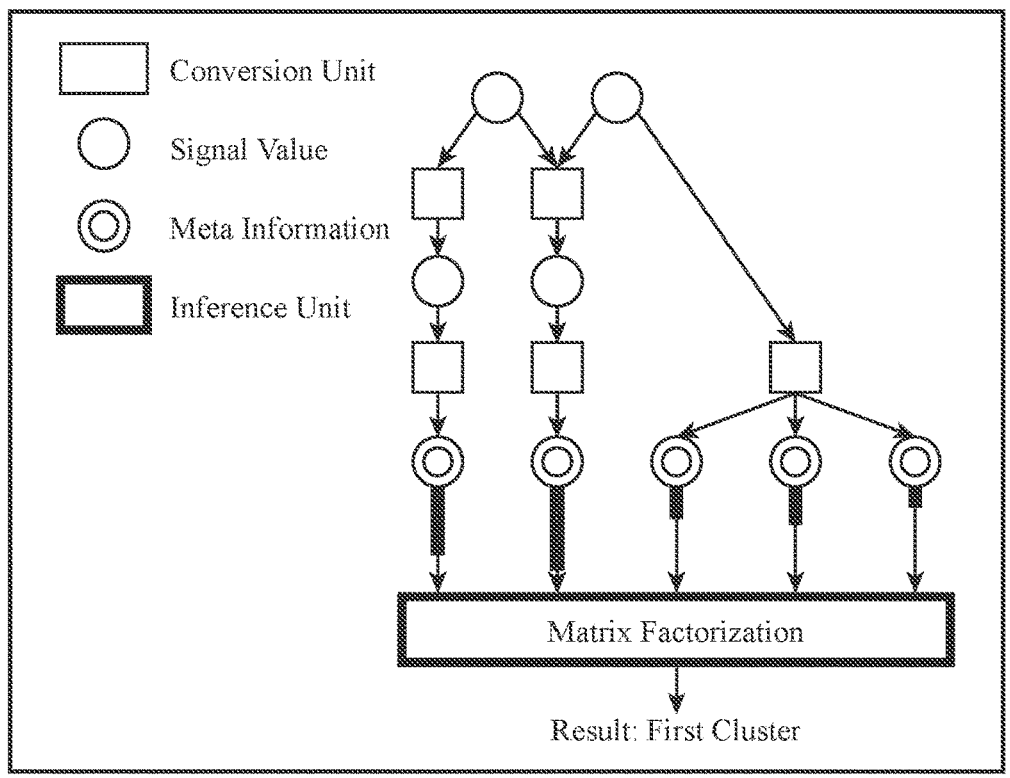
FIGS. 5A and 5B are diagrams each showing an example of the image shown by the image information generated by the image generation unit according to Embodiment 1.
Figure 5B:
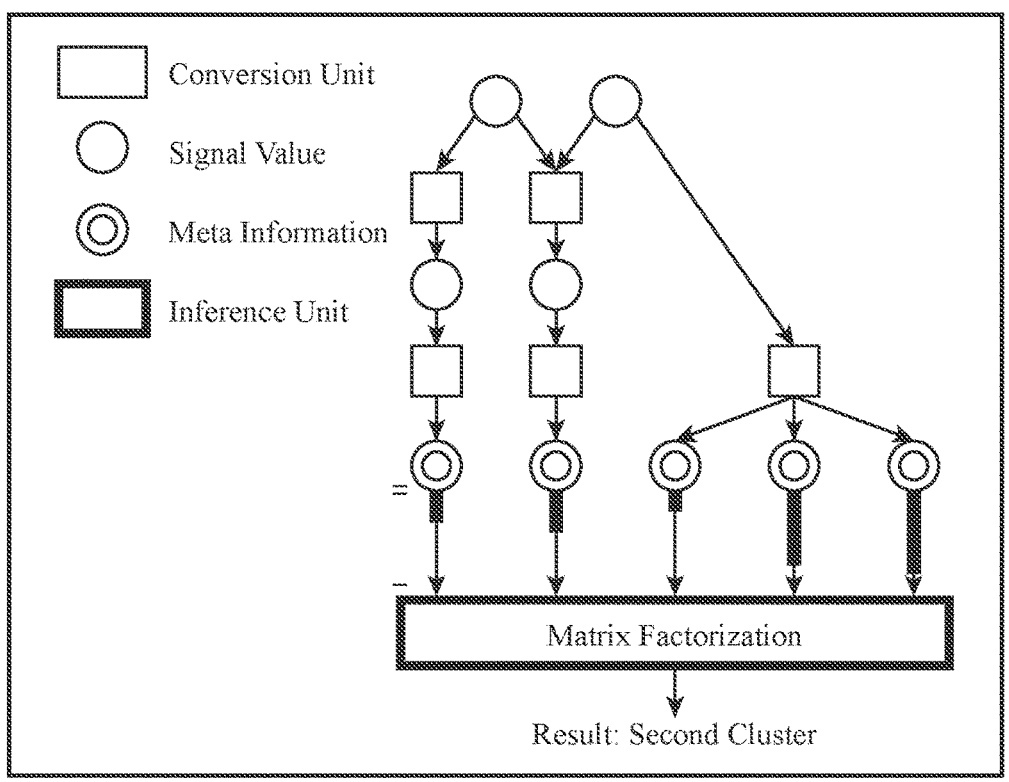

FIGS. 5A and 5B are diagrams each showing an example of the image shown by the image information which the image generation unit 190 generates in the case in which the inference unit 130 makes an inference by using the matrix analytic model.

In FIGS. 3A and 3B, four conversion unit images 111-1, 111-2, 111-3, and 111-4 in the image shown by the image information generated by the image generation unit 190 show respectively the four conversion units 110-1, 110-2, 110-3, and 110-4 included in the software program.

Further, in FIGS. 3A and 3B, four output information images 112-1, 112-2, 112-3, and 112-4 in the image shown by the image information generated by the image generation unit 190 show the respective pieces of output information outputted by the four conversion units 110-1, 110-2, 110-3, and 110-4 included in the software program.

In FIG. 3A, the significance degrees of the feature quantity, the significance degrees being shown by the pieces of information used for design outputted by the result interpretation unit 180, are expressed by the lengths of heavy lines superimposed onto an inference unit input line image.

In FIG. 3B, the significance degrees of the feature quantity, the significance degrees being shown by the information used for design outputted by the result interpretation unit 180, are displayed in the form of a bar graph on a right side of the output information images 112-1, 112-2, 112-3, and 112-4 showing the pieces of output information outputted by the respective one or more final conversion units 110-1, 110-2, 110-3, and 110-4.

In the case in which the inference unit 130 makes an inference by using the supervised learning model, the significance degree of the feature quantity of information inputted to the inference unit 130 has an influence on the inference result. The user can redesign the software program, by performing addition or deletion of a conversion unit, a change of either the conversion unit connection relationship or the inference unit connection relationship, or the like, while referring to the significance degree of the feature quantity of information inputted to the inference unit 130, the significance degree being displayed on the display device 14.

A method of expressing the significance degrees of the feature quantity, the significance degrees being shown by the information used for design outputted by the result interpretation unit 180 in FIG. 3A or 3B, is an example and is not limited to this example.

FIG. 4 shows an example of the image shown by the image information generated by the image generation unit 190 in the case in which the inference unit 130 makes an inference by using a Gaussian mixture model as the probability model.

Particularly, FIG. 4 shows, as an example, the case in which the inference unit 130 performs abnormality detection for determining the existence or nonexistence of an abnormality by using the Gaussian mixture model.

In FIG. 4, averages of Gaussian distributions showing differences to normal values are expressed by the lengths of heavy lines superimposed onto an inference unit input line image. The differences to the normal values are given by parameters in the probability model, the parameters being shown by the information used for design outputted by the result interpretation unit 180.

In the case in which the inference unit 130 performs abnormality detection for determining the existence or nonexistence of an abnormality by using the Gaussian mixture model, when the inference unit 130 detects an abnormality, the user can infer which output information, out of the pieces of output information outputted by the respective one or more final conversion units 110-1, 110-2, 110-3, and 110-4, has an influence on the inference in the inference unit 130, by referring to the averages of the Gaussian distributions, the averages being displayed on the display device 14 and inputted to the inference unit 130. Further, the user can redesign the software program, by performing addition or deletion of a conversion unit, a change of either the conversion unit connection relationship or the inference unit connection relationship, or the like, while referring to the average of the Gaussian distribution of information inputted to the inference unit 130, the average being displayed on the display device 14.

A method of expressing the parameters in the probability model, the parameters being shown by the information used for design outputted by the result interpretation unit 180 in FIG. 4, is an example and is not limited to this example.

FIG. 5A or 5B shows, as an example, the case in which the inference unit 130 infers which of first and second clusters prepared in advance the multiple signal values outputted from the signal output device 11 are, using the matrix analytic model.

In FIG. 5A or 5B, the inference unit 130 infers a cluster on the basis of the basis vectors outputted by the one or more final conversion units 110-3, 110-4, and 110-5.

In FIG. 5A or 5B, the lengths of the basis vectors shown by the information used for design outputted by the result interpretation unit 180 are expressed by the lengths of heavy lines superimposed onto an inference unit input line image.

In the case in which the inference unit 130 infers a cluster by using the matrix analytic model, when the inference unit 130 infers a cluster, the user can infer which basis vector has an influence on the inference in the inference unit 130, by referring to the basis vectors displayed on the display device 14 and inputted to the inference unit 130. Further, the user can redesign the software program, by performing addition or deletion of a conversion unit, a change of either the conversion unit connection relationship or the inference unit connection relationship, or the like, while referring to the basis vectors displayed on the display device 14 and inputted to the inference unit 130.

A method of expressing the basis vectors shown by the information used for design outputted by the result interpretation unit 180 in FIG. 5A or 5B is an example and is not limited to this example.

The automated design unit 165 automatically designs the software program which the user develops or designs, in such a way as to improve the performance which is expected from either the conversion unit connection relationship or the inference unit connection relationship.

The automated design unit 165 determines whether or not an automated design mode to automatically design a software program is selected, on the basis of the operation information acquired by the operation acquisition unit 101. When determining that the automated design mode is selected, the automated design unit 165 automatically designs the conversion unit connection relationship and the inference unit connection relationship.

Concretely, for example, the automated design unit 165 improves the performance which is expected from either the conversion unit connection relationship or the inference unit connection relationship, by automatically changing a parameter which one or more of the multiple conversion units 110-1, 110-2, . . . , and 110-N or the inference unit 130 uses.

More concretely, for example, the automated design unit 165 automatically changes a parameter which one or more of the multiple conversion units 110-1, 110-2, . . . , and 110-N or the inference unit 130 uses, in such a way as to optimize the parameter, by using the learning result which the learning unit 170 outputs by performing the learning processing, and by applying an optimization algorithm, such as a random search, a grid search, Bayesian optimization, or a genetic algorithm.

Instead, for example, the automated design unit 165 may improve the performance which is expected from either the conversion unit connection relationship or the inference unit connection relationship, by automatically changing either the conversion unit connection relationship or the inference unit connection relationship.

More concretely, for example, the automated design unit 165 automatically performs addition or deletion of a conversion unit, a change of either the conversion unit connection relationship or the inference unit connection relationship, or the like, by using the learning result which the learning unit 170 outputs by performing the learning processing, and by applying an optimization algorithm, such as a genetic algorithm, reinforcement learning, or combinatorial optimization.

As for the optimization algorithm which the automated design unit 165, it is possible to acquire the software program corresponding to the optimization algorithm which the automated design unit 165 uses, from, for example, the software library stored in the storage device 12 via the library acquisition unit 135.

The visualization processing unit 185 processes either the pieces of output information outputted by the multiple conversion units 110-1, 110-2, ..., and 110-N or the input data inputted to the one or more initial conversion units 110-S1, 110-S2, ..., and 110-Sn into visualization output information for visualizing, as a distribution, a waveform, or the like, either the pieces of output information or the input data, and outputs the processed visualization output information to the image generation unit 190.

The image generation unit 190 may generate image information for, in addition to visualizing the conversion unit connection relationship and the inference unit connection relationship, visualizing, using a distribution, a waveform, or the like, either the pieces of output information outputted by the multiple conversion units 110-1, 110-2, ..., and 110-N or the input data inputted to the one or more initial conversion units 110-S1, 110-S2, ..., and 110-Sn on the basis of the visualization output information outputted by the visualization processing unit 185.

Figure 6:
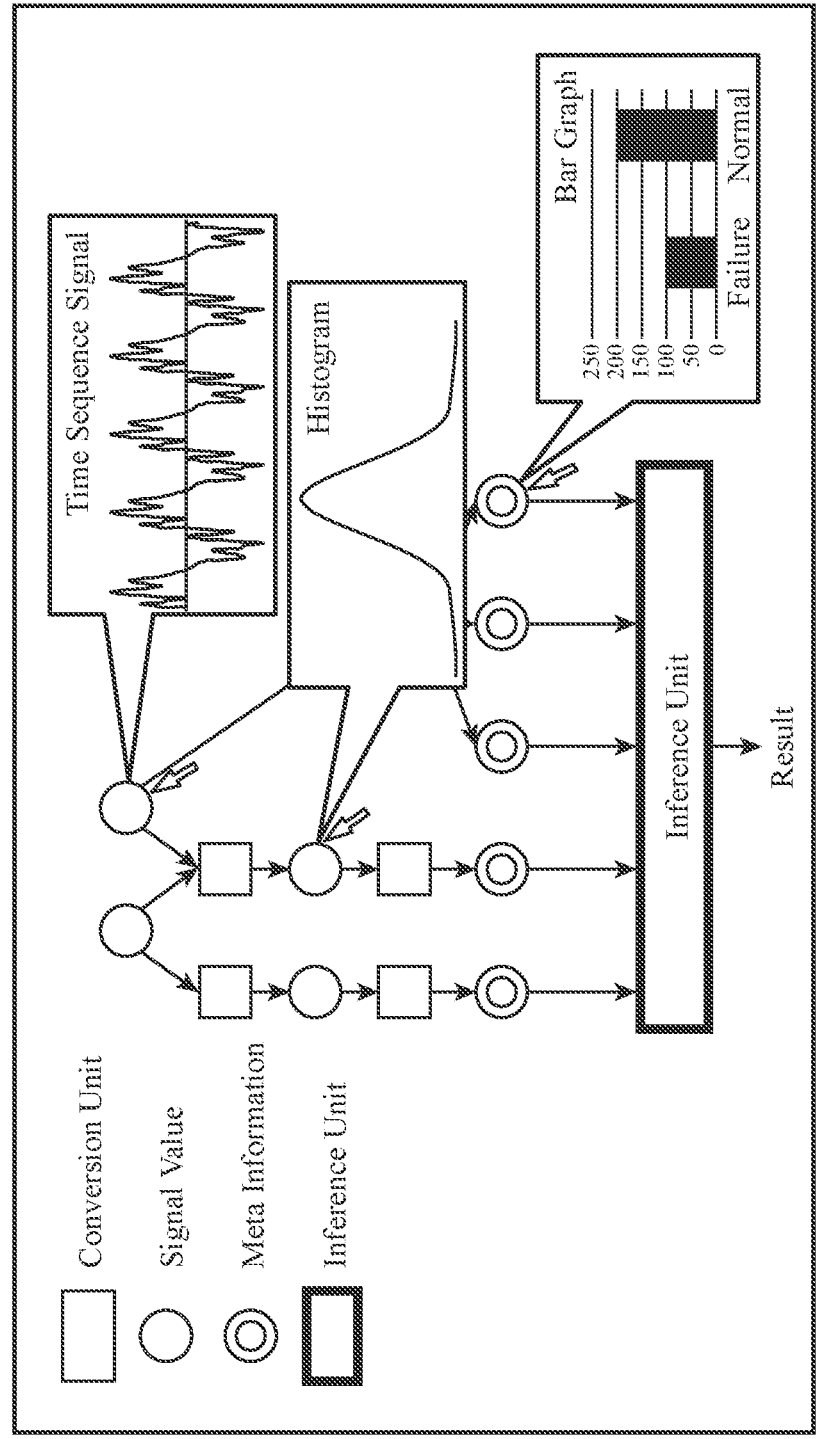

FIG. 6 is a diagram showing an example of the image which is shown by the image information generated by the image generation unit 190, and in which either the output information outputted by a user-selected one of the multiple conversion units 110-1, 110-2, ..., and 110-N or the input data inputted to a user-selected one of the one or more initial conversion units 110-S1, 110-S2, ..., and 110-Sn is visualized using a distribution, a waveform, or the like.

In FIG. 6, each arrow shape is a pointer as mentioned above.

The user can move a pointer which is superimposed on the image displayed on the display device 14 and shown by the image information generated by the image generation unit 190, to the position or the region of either a desired one of the output information images 112-1, 112-2, ..., and 112-N or a desired one of the one or more input data images showing the one or more pieces of input data inputted to the one or more initial conversion units 110-S1, 110-S2, ..., and 110-Sn in the image displayed on the display device 14, by performing operational input on the input device 13 such as a mouse.

The image generation unit 190 generates image information for, in addition to visualizing the conversion unit connection relationship and the inference unit connection relationship, to produce a pop-up display of, using a distribution, a waveform, or the like, either the output information shown by the output information image or the input data shown by the input data image corresponding to the position of each pointer in the image displayed on the display device 14, on the basis of the operation information showing the above-mentioned operational input by the user, as shown in FIG. 6.

The image shown in FIG. 6 and shown by the image information generated by the image generation unit 190 is an example and is not limited to this example.

The image generation unit 190 generates image information for, in addition to visualizing the conversion unit connection relationship and the inference unit connection relationship, visualizing either the output information outputted by the selected conversion unit or the input data inputted to the selected initial conversion unit by using a distribution, a waveform, or the like, thereby making it possible for the user to easily grasp the output information outputted by the selected conversion unit and the input data inputted to the selected initial conversion unit.

The image generation unit 190 may visualize the conversion unit connection relationship by using a group image into which two or more of the conversion unit images 111-1, 111-2, ..., and 111-N are grouped, when visualizing the conversion unit connection relationship and the inference unit connection relationship.

The conversion unit images which are grouped into the group image are determined by, for example, a user's selection, via performing operational input on the input device 13 such as a mouse, of two or more of the conversion unit images 111-1, 111-2, ..., and 111-N in the image displayed on the display device 14 and shown by the image information generated by the image generation unit 190.

The conversion unit images which are grouped into the group image may be determined by, for example, the automated design unit 165's automatic determination of two or more conversion units which perform the same converting process, out of the multiple conversion units 110-1, 110-2, ..., and 110-N.

Figure 7A:
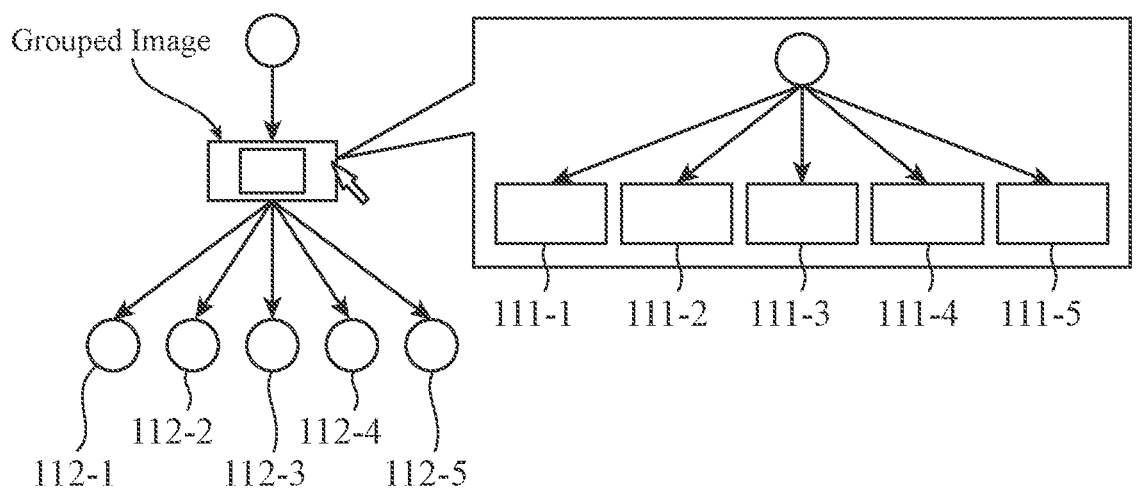
FIGS. 7A and 7B are diagrams each showing an example of a group image into which multiple conversion unit images in the image shown by the image information generated by the image generation unit according to Embodiment 1 are grouped.
Figure 7B:
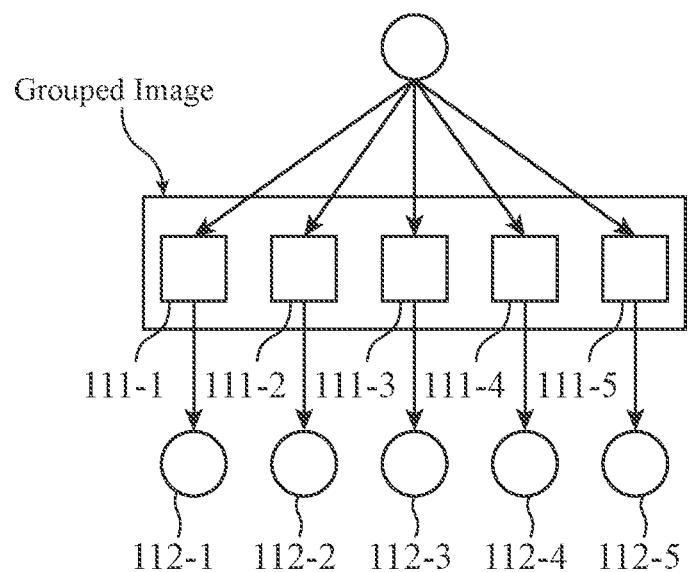

FIGS. 7A and 7B are diagrams each showing an example of the group image into which the five conversion unit images 111-1, 111-2, 111-3, 111-4, and 111-5, out of the multiple conversion unit images 111-1, 111-2, ..., and 111-N in the image shown by the image information generated by the image generation unit 190, are grouped.

FIG. 7A shows an example in which the group image into which the five conversion unit images 111-1, 111-2, 111-3, 111-4, and 111-5 are grouped is collapsed and displayed.

FIG. 7B shows an example in which the group image into which the five conversion unit images 111-1, 111-2, 111-3, 111-4, and 111-5 are grouped is expanded and displayed.

In FIG. 7A, an arrow shape is a pointer as mentioned above.

For example, the image generation unit 190 may generate image information to produce a pop-up display of the five conversion unit images 111-1, 111-2, 111-3, 111-4, and 111-5 which are grouped into the collapsed group image, as shown in FIG. 7A.

Concretely, for example, the user moves the pointer which is superimposed on the image displayed on the display device 14 and shown by the image information generated by the image generation unit 190, to the position or the region of the group image in the image displayed on the display device 14, by performing operational input on the input devices 13 such as a mouse.

The image generation unit 190 generates image information for, in addition to visualizing the conversion unit connection relationship and the inference unit connection relationship, producing a pop-up display of the five conversion unit images 111-1, 111-2, 111-3, 111-4, and 111-5 which are grouped into the group image corresponding to the position of the pointer in the image displayed on the display device 14, on the basis of the operation information showing the above-mentioned operational input by the user, as shown in FIG. 7.

The image generation unit 190 may select one piece of image information to be generated from multiple pieces of image information showing images illustrated in FIG. 7A or 7B on the basis of the operation information acquired by the operation acquisition unit 101, and generate the selected image information.

The images shown in FIG. 7A or FIG. 7B and shown by the pieces of image information generated by the image generation unit 190 are examples and are not limited to these examples.

When visualizing the conversion unit connection relationship and the inference unit connection relationship, the image generation unit 190 visualizes the conversion unit connection relationship by using a group image, thereby making it possible for the user to easily grasp the conversion unit connection relationship.

Figure 8A:
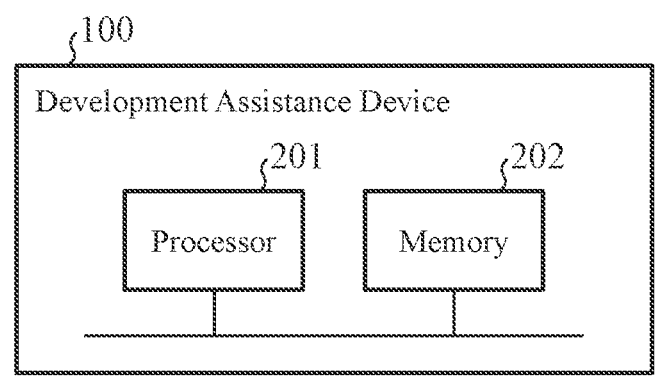
FIGS. 8A and 8B are diagrams each showing an example of the hardware configuration of a main part of the development assistance device according to Embodiment 1.
Figure 8B:
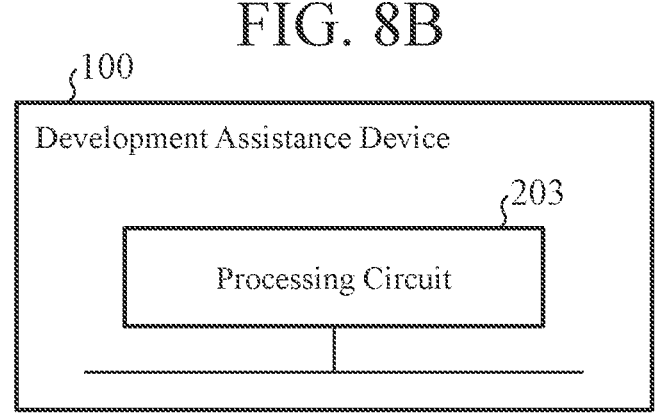

Referring to FIGS. 8A and 8B, the hardware configuration of the main part of the development assistance device 100 according to Embodiment 1 will be explained.

FIGS. 8A and 8B are diagrams each showing an example of the hardware configuration of the main part of the development assistance device 100 according to Embodiment 1.

As shown in FIG. 8A, the development assistance device 100 includes a computer and this computer has a processor 201 and a memory 202. In the memory 202, a program for causing the computer to function as the operation acquisition unit 101, the multiple conversion units 110-1, 110-2, . . . , and 110-N, the pipeline unit 120, the inference unit 130, the library acquisition unit 135, the parameter setting unit 140, the information acquisition unit 150, the information formatting unit 155, the pipeline changing unit 160, the image generation unit 190, the output control unit 195, the automated design unit 165, the learning unit 170, the result interpretation unit 180, and the visualization processing unit 185 is stored. The operation acquisition unit 101, the multiple conversion units 110-1, 110-2, . . . , and 110-N, the pipeline unit 120, the inference unit 130, the library acquisition unit 135, the parameter setting unit 140, the information acquisition unit 150, the information formatting unit 155, the pipeline changing unit 160, the image generation unit 190, the output control unit 195, the automated design unit 165, the learning unit 170, the result interpretation unit 180, and the visualization processing unit 185 are implemented, by the processor 201's reading and executing the program stored in the memory 202.

Instead, as shown in FIG. 8B, the development assistance device 100 may include a processing circuit 203. In this case, the functions of the operation acquisition unit 101, the multiple conversion units 110-1, 110-2, . . . , and 110-N, the pipeline unit 120, the inference unit 130, the library acquisition unit 135, the parameter setting unit 140, the information acquisition unit 150, the information formatting unit 155, the pipeline changing unit 160, the image generation unit 190, the output control unit 195, the automated design unit 165, the learning unit 170, the result interpretation unit 180, and the visualization processing unit 185 may be implemented by the processing circuit 203.

Instead, the development assistance device 100 may include a processor 201, a memory 202, and a processing circuit 203 (not illustrated). In this case, some of the functions of the operation acquisition unit 101, the multiple conversion units 110-1, 110-2, . . . , and 110-N, the pipeline unit 120, the inference unit 130, the library acquisition unit 135, the parameter setting unit 140, the information acquisition unit 150, the information formatting unit 155, the pipeline changing unit 160, the image generation unit 190, the output control unit 195, the automated design unit 165, the learning unit 170, the result interpretation unit 180, and the visualization processing unit 185 may be implemented by the processor 201 and the memory 202, and the remaining functions may be implemented by the processing circuit 203.

As for the processor 201, for example, a central processing unit (CPU), a graphics processing unit (GPU), a microprocessor, a microcontroller, or a digital signal processor (DSP) is used.

As for the memory 202, for example, a semiconductor memory or a magnetic disk is used. More concretely, as for the memory 202, a random access memory (RAM), a read only memory (ROM), a flash memory, an erasable programmable read only memory (EPROM), an electrically erasable programmable read-only memory (EEPROM), a solid state drive (SSD), a hard disk drive (HDD), or the like is used.

As for the processing circuit 203, for example, an application specific integrated circuit (ASIC), a programmable logic device (PLD), a field-programmable gate array (FPGA), a system-on-a-chip (SoC), or a system large-scale integration (LSI) is used.

Figure 9:
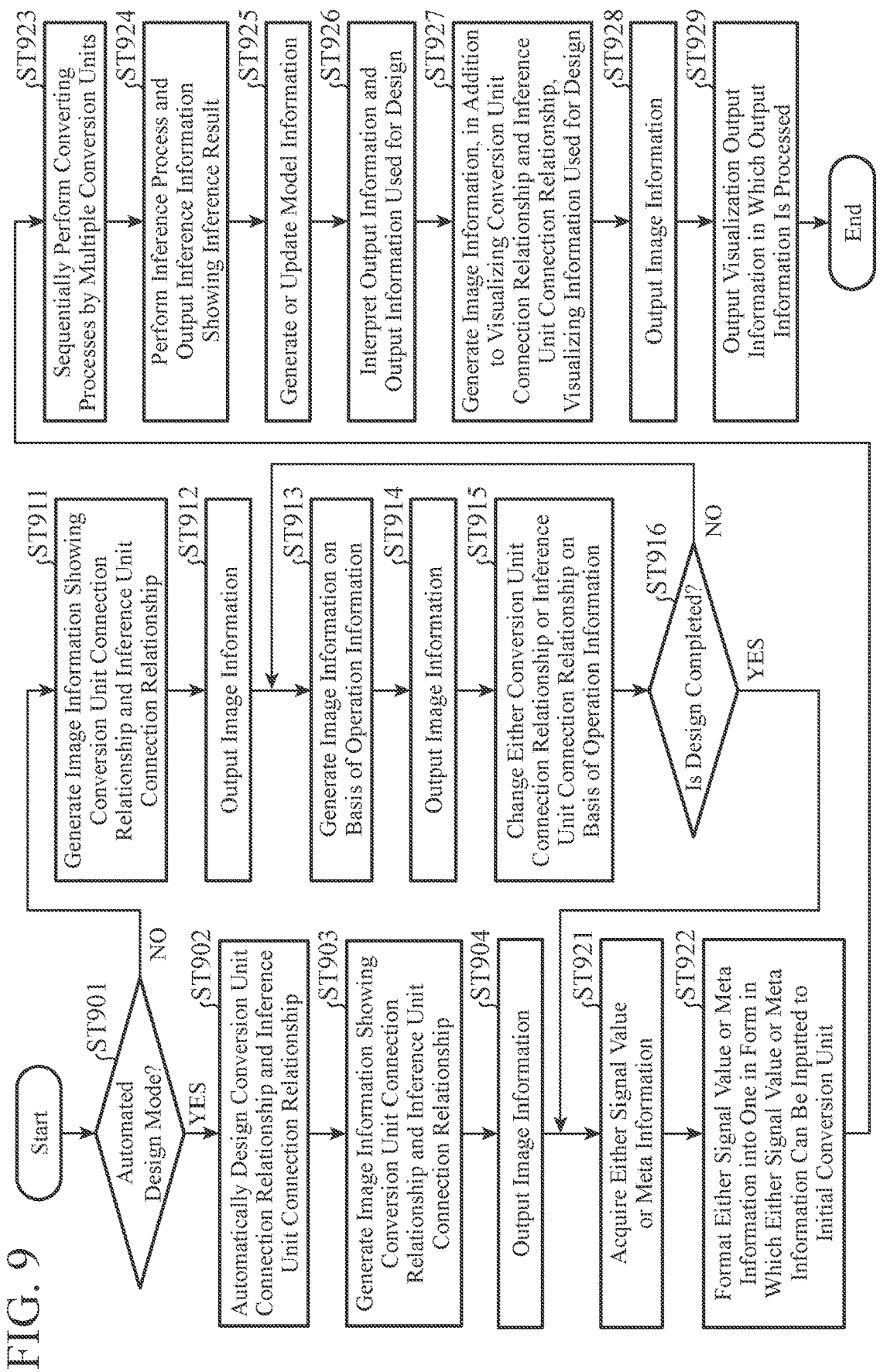
FIG. 9 is a flowchart for explaining an example of the processing of the development assistance device according to Embodiment 1.

Referring to FIG. 9, the operation of the development assistance device 100 according to Embodiment 1 will be explained.

FIG. 9 is a flowchart for explaining an example of the processing of the development assistance device 100 according to Embodiment 1. The processing in this flowchart is repeatedly performed every time when the operation acquisition unit 101 acquires the operation information showing operational input which the user makes to start designing or redesigning a software program.

First, in step ST901, the automated design unit 165 determines whether or not the automated design mode to automatically design a software program is selected, on the basis of the operation information acquired by the operation acquisition unit 101.

When in step ST901, the automated design unit 165 determines that the automated design mode is selected, in step ST902, the automated design unit 165 automatically designs a conversion unit connection relationship and an inference unit connection relationship.

After step ST902, in step ST903, the image generation unit 190 generates image information showing the conversion unit connection relationship and the inference unit connection relationship.

After step ST903, in step ST904, the image generation unit 190 outputs the generated image information to the output control unit 195.

After step ST904, the development assistance device 100 performs a process of step ST921.

When in step ST901, the automated design unit 165 determines that the automated design mode is not selected, in step ST911, the image generation unit 190 generates image information showing the conversion unit connection relationship and the inference unit connection relationship of a software program which is designed in advance, for example.

After step ST911, in step ST912, the image generation unit 190 outputs the generated image information to the output control unit 195.

After step ST912, in step ST913, the image generation unit 190 generates image information in such a way as to change either the conversion unit connection relationship or the inference unit connection relationship in the image shown by the image information on the basis of the operation information acquired by the operation acquisition unit 101.

After step ST913, in step ST914, the image generation unit 190 outputs the generated image information to the output control unit 195.

After step ST914, in step ST915, the pipeline changing unit 160 changes either the conversion unit connection relationship or the inference unit connection relationship on the basis of the operation information acquired by the operation acquisition unit 101.

After step ST915, in step ST916, the pipeline changing unit 160 determines whether or not a manually-operated design of the software program is completed, on the basis of the operation information acquired by the operation acquisition unit 101.

When in step ST916, the pipeline changing unit 160 determines that the manually-operated design of the software program is not completed, the processing by the development assistance device 100 returns to the process of step ST913.

When in step ST916, the pipeline changing unit 160 determines that the manually-operated design of the software program is completed, the development assistance device 100 performs a process of step ST921.

In step ST921, the information acquisition unit 150 acquires either the signal value or the meta information.

Then, in step ST922, the information formatting unit 155 formats either the signal value or the meta information which is acquired by the information acquisition unit 150 into a form in which either the signal value or the meta information can be inputted as input data to one or more initial conversion units 110-S1, 110-S2, . . . , and 110-Sn.

Then, in step ST923, the pipeline unit 120 causes, on the basis of the pipeline information, the multiple conversion units 110-1, 110-2, . . . , and 110-N to sequentially perform the corresponding converting processes.

Then, in step ST924, the inference unit 130 performs the inference process by using the output information outputted by one or more final conversion units 110-L1, 110-L2, . . . , and 110-Lm, and outputs inference information showing a result of the inference.

Then, in step ST925, the learning unit 170 performs the learning processing in machine learning and generates or updates model information showing the learning model.

Then, in step ST926, the result interpretation unit 180 interprets the output information outputted by each of the one or more final conversion units 110-L1, 110-L2, . . . , and 110-Lm, processes the output information into information in a predetermined form, and outputs the information after process as information used for design.

Then, in step ST927, the image generation unit 190 generates image information for, in addition to visualizing the conversion unit connection relationship and the inference unit connection relationship, visualizing the information used for design outputted by the result interpretation unit 180.

Then, in step ST928, the image generation unit 190 outputs the generated image information to the output control unit 195.

Then, in step ST929, the visualization processing unit 185 processes the pieces of output information outputted by the multiple conversion units 110-1, 110-2, . . . , and 110-N into visualization output information for visualizing the output information as a distribution, a waveform or the like, and outputs the processed visualization output information to the image generation unit 190.

After step ST929, the development assistance device 100 ends the processing in the flowchart and repeatedly performs the processing in the flowchart every time when the operation acquisition unit 101 acquires the operation information showing operational input which the user makes to start designing or redesigning a software program.

As long as the process of step ST929 is performed after the process of step ST904 or ST912, the process of step ST929 may be configured so that the user can instruct the development assistance device 100 to perform the process at a proper timing. After the process of step ST929, in the development assistance device 100, the image generation unit 190 generates image information for, in addition to visualizing the conversion unit connection relationship and the inference unit connection relationship, visualizing, using a distribution, a waveform or the like, the output information outputted by a user-selected conversion unit, on the basis of the visualization output information outputted by the visualization processing unit 185 and the operation information acquired by the operation acquisition unit 101.

Further, in the case in which the development assistance device 100 does not include the automated design unit 165, the processes in steps ST901 to ST904 in the flowchart are not performed.

Further, in the case in which the development assistance device 100 does not include the learning unit 170, the process in step ST925 in the flowchart is not performed.

Further, in the case in which the development assistance device 100 does not include the result interpretation unit 180, the processes in steps ST926 to ST928 in the flowchart are not performed.

Further, in the case in which the development assistance device 100 does not include the visualization processing unit 185, the process in step ST929 in the flowchart is not performed.

Further, in step ST903, when visualizing the conversion unit connection relationship and the inference unit connection relationship, the image generation unit 190 may visualize the conversion unit connection relationship by using a group image into which two or more of the multiple conversion unit images 111-1, 111-2, . . . , and 111-N are grouped.

Further, in step ST911, the image information generated by the image generation unit 190 may produce some of the multiple conversion unit images 111-1, 111-2, . . . , and 111-N, the output information images 112-1, 112-2, . . . , and 112-N, the inference unit image, the output line image, the input line image, or the inference unit input line image, which show the conversion unit connection relationship and the inference unit connection relationship.

Further, in step ST911, when visualizing the conversion unit connection relationship and the inference unit connection relationship, the image generation unit 190 may visualize the conversion unit connection relationship by using a group image into which two or more of the multiple conversion unit images 111-1, 111-2, . . . , and 111-N are grouped.

Further, in step ST913, when visualizing the conversion unit connection relationship and the inference unit connection relationship, the image generation unit 190 may visualize the conversion unit connection relationship by using a group image into which two or more of the multiple conversion unit images 111-1, 111-2, . . . , and 111-N are grouped.

As mentioned above, the development assistance device 100 includes: the multiple conversion units 110-1, 110-2, . . . , and 110-N each for converting an inputted signal value into either a different signal value or meta information or converting inputted meta information into either a signal value or different meta information, and for outputting either the signal value after conversion or the meta information after conversion as output information; the pipeline unit 120 for causing, on the basis of the pipeline information showing the relationship of the mutual connections between the multiple conversion units 110-1, 110-2, . . . , and 110-N, the multiple conversion units 110-1, 110-2, . . . , and 110-N to sequentially perform the corresponding converting processes; the inference unit 130 for making an inference, by using the output information outputted by the one or more final conversion units 110-L1, 110-L2, . . . , and 110-Lm which the pipeline unit 120 causes, on the basis of the pipeline information, to finally perform the corresponding converting processes, out of the multiple conversion units 110-1, 110-2, . . . , and 110-N, and for outputting inference information showing a result of the inference; the image generation unit 190 for generating image information for visualizing the relationship of the mutual connections between the multiple conversion units 110-1, 110-2, . . . , and 110-N, the relationship being shown by the pipeline information, and the relationship of the connection between the one or more final conversion units 110-L1, 110-L2, . . . , and 110-Lm and the inference unit 130; and the output control unit 195 for outputting the image information generated by the image generation unit 190.

With the configuration as above, the development assistance device 100 can perform visualization of preprocessing on the original data. Therefore, the development assistance device 100 can perform assistance for the development or the design of an inference model, the assistance including the design of information inputted to the inference model.

It is to be understood that changes can be made in an arbitrary component in the embodiment, or an arbitrary component in the embodiment can be omitted within the scope of the present invention.

INDUSTRIAL APPLICABILITY

The development assistance device according to the present invention can be used in development assistance systems for software programs.

REFERENCE SIGNS LIST

10 development assistance system, 11 signal output device, 12 storage device, 13 input device, 14 display device, 100 development assistance device, 101 operation acquisition unit, 110-1, 110-1, . . . , and 110-N conversion unit, 120 pipeline unit, 130 inference unit, 135 library acquisition unit, 140 parameter setting unit, 150 information acquisition unit, 155 information formatting unit, 160 pipeline changing unit, 165 automated design unit, 170 learning unit, 180 result interpretation unit, 185 visualization processing unit, 190 image generation unit, 195 output control unit, 111-1, 111-1, . . . , and 111-N conversion unit image, 112-1, 112-2, . . . , and 112-4 output information image, 201 processor, 202 memory, and 203 processing circuit.

The invention claimed is:
1. A development assistance device comprising:
a processor and a memory storing a program that causes the processor to function as,
multiple pieces of conversion processing circuitry each to convert an inputted signal value of an electric signal, acquired from one of a sensor and an antenna, into either a different signal value or meta information or convert inputted meta information, including a summary statistics in the signal value, into either a signal value or different meta information, and to output either the signal value after conversion or the meta information after conversion as output information;
pipeline processing circuitry to cause, on a basis of pipeline information showing a relationship of mutual connections between the multiple pieces of conversion processing circuitry, the multiple pieces of conversion processing circuitry to sequentially perform corresponding converting processes;
inference processing circuitry to make an inference by using the output information outputted by one or more pieces of final conversion processing circuitry which the pipeline processing circuitry causes, on a basis of the pipeline information, to finally perform corresponding converting processes, out of the multiple pieces of conversion processing circuitry that performed initial conversion processes, and to output inference information showing a result of the inference by performing inference processing including at least one of machine learning and data mining;
image generation processing circuitry to generate image information for visualizing the relationship of the mutual connections between the multiple pieces of conversion processing circuitry, the relationship being shown by the pipeline information, and a relationship of a connection between the one or more pieces of final conversion processing circuitry and the inference processing circuitry; and
output control processing circuitry to output the image information generated by the image generation processing circuitry.
2. The development assistance device according to claim 1, wherein the program further causes the processor to function as,
operation acquisition processing circuitry to acquire operation information outputted by an input device, and wherein the image generation processing circuitry generates the image information in such a way as to change either the relationship of the mutual connections between the multiple pieces of conversion processing circuitry, the relationship being shown by the pipeline information, or the relationship of the connection between the one or more pieces of final conversion processing circuitry and the inference processing circuitry in an image shown by the image information on a basis of the operation information acquired by the operation acquisition processing circuitry.
3. The development assistance device according to claim 2, wherein the program further causes the processor to function as,
pipeline changing processing circuitry to change either the relationship of the mutual connections between the multiple pieces of conversion processing circuitry, the relationship being shown by the pipeline information, or the relationship of the connection between the one or more pieces of final conversion processing circuitry and the inference processing circuitry on a basis of the operation information acquired by the operation acquisition processing circuitry.

4. The development assistance device according to claim 1, wherein the program further causes the processor to function as,
result interpretation processing circuitry to interpret the output information outputted by the one or more pieces of final conversion processing circuitry, to process the output information into information in a predetermined form, and to output the information after process as information used for design,
wherein the image generation processing circuitry generates the image information for, in addition to visualizing the relationship of the mutual connections between the multiple pieces of conversion processing circuitry, the relationship being shown by the pipeline information, and the relationship of the connection between the one or more pieces of final conversion processing circuitry and the inference processing circuitry, visualizing the information used for design.

5. The development assistance device according to claim 4, wherein in a case in which the inference processing circuitry makes an inference by using a supervised learning model, the result interpretation processing circuitry interprets the output information outputted by the one or more pieces of final conversion processing circuitry connected to the inference processing circuitry, calculates a significance degree of a feature quantity, the significance degree being a degree of influence on an inference in the inference processing circuitry, and outputs the calculated significance degree of the feature quantity as the information used for design.

6. The development assistance device according to claim 4, wherein in a case in which the inference processing circuitry makes an inference by using a probability model, the result interpretation processing circuitry interprets the output information outputted by the one or more pieces of final conversion processing circuitry connected to the inference processing circuitry, calculates a parameter in the probability model, and outputs the calculated parameter in the probability model as the information used for design.

7. The development assistance device according to claim 4, wherein in a case in which the inference processing circuitry makes an inference by using a matrix analytic model, the result interpretation processing circuitry interprets the output information outputted by the one or more pieces of final conversion processing circuitry connected to the inference processing circuitry, calculates a basis vector, and outputs the calculated basis vector as the information used for design.

8. The development assistance device according to claim 1, wherein the program further causes the processor to function as,
automated design processing circuitry to automatically perform design based on the relationship of the mutual connections between the multiple pieces of conversion processing circuitry, the relationship being shown by the pipeline information, and the relationship of the connection between the one or more pieces of final conversion processing circuitry and the inference processing circuitry.

9. The development assistance device according to claim 8, wherein the automated design processing circuitry automatically changes a parameter used by either one or more of the multiple pieces of conversion processing circuitry or the inference processing circuitry, thereby improving the performance which is expected from the relationship of the mutual connections between the multiple pieces of conversion processing circuitry, the relationship being shown by the pipeline information, and the relationship of the connection between the one or more pieces of final conversion processing circuitry and the inference processing circuitry.

10. The development assistance device according to claim 8, wherein the automated design processing circuitry automatically changes either the relationship of the mutual connections between the multiple pieces of conversion processing circuitry, the relationship being shown by the pipeline information, or the relationship of the connection between the one or more pieces of final conversion processing circuitry and the inference processing circuitry based on, the relationship of the mutual connections between the multiple pieces of conversion processing circuitry, the relationship being shown by the pipeline information, and the relationship of the connection between the one or more pieces of final conversion processing circuitry and the inference processing circuitry.

11. The development assistance device according to claim 1, wherein the program further causes the processor to function as,
visualization processing circuitry to process the output information outputted by each of the multiple pieces of conversion processing circuitry or input data inputted to one or more pieces of initial conversion processing circuitry which are caused to perform corresponding converting processes first, out of the multiple pieces of conversion processing circuitry, into visualization output information for visualizing either the output information or the input data as a distribution or a waveform, and to output the processed visualization output information,
wherein the image generation processing circuitry generates the image information for, in addition to visualizing the relationship of the mutual connections between the multiple pieces of conversion processing circuitry, the relationship being shown by the pipeline information, and the relationship of the connection between the one or more pieces of final conversion processing circuitry and the inference processing circuitry, visualizing the output information outputted by each of the multiple pieces of conversion processing circuitry by using a distribution or a waveform on a basis of the visualization output information outputted by the visualization processing circuitry.

12. The development assistance device according to claim 1, wherein when visualizing the relationship of the mutual connections between the multiple pieces of conversion processing circuitry, the relationship being shown by the pipeline information, and the relationship of the connection between the one or more pieces of final conversion processing circuitry and the inference processing circuitry, the image generation processing circuitry groups two or more of the multiple pieces of conversion processing circuitry and visualizes the relationship of the mutual connections between the multiple pieces of conversion processing circuitry.

13. A development assistance system comprising:
a development assistance device that includes:
- a processor and a memory storing a program that causes the processor to function as,
- multiple pieces of conversion processing circuitry each to convert an inputted signal value of an electric signal, acquired from one of a sensor and an antenna, into either a different signal value or meta information or convert inputted meta information, including a summary statistics in the signal value, into either a signal value or different meta information, and to output either the signal value after conversion or the meta information after conversion as output information;
- pipeline processing circuitry to cause, on a basis of pipeline information showing a relationship of mutual connections between the multiple pieces of conversion processing circuitry, the multiple pieces of conversion processing circuitry to sequentially perform corresponding converting processes;
- inference processing circuitry to make an inference by using the output information outputted by one or more pieces of final conversion processing circuitry which the pipeline processing circuitry causes, on a basis of the pipeline information, to finally perform corresponding converting processes, out of the multiple pieces of conversion processing circuitry that performed initial conversion processes, and to output inference information showing a result of the inference by performing inference processing including at least one of machine learning and data mining;
- image generation processing circuitry to generate image information for visualizing the relationship of the mutual connections between the multiple pieces of conversion processing circuitry, the relationship being shown by the pipeline information, and a relationship of a connection between the one or more pieces of final conversion processing circuitry and the inference processing circuitry; and
- output control processing circuitry to output the image information generated by the image generation processing circuitry;

an input device to receive input from a user and outputting operation information showing the received input to the development assistance device; and
a display device to display the image information outputted by the development assistance device.

14. A development assistance method comprising:
- in each of multiple conversion processes, converting an inputted signal value of an electric signal, acquired from one of a sensor and an antenna, into either a different signal value or meta information or converting inputted meta information, including a summary statistics in the signal value, into either a signal value or different meta information, and outputting either the signal value after conversion or the meta information after conversion as output information;
- causing, on a basis of pipeline information showing a relationship of mutual connections between the multiple conversion processes, the multiple conversion processes to sequentially perform corresponding converting processes;
- in an inference process, making an inference by using the output information outputted by one or more final conversion processes which are caused, on a basis of the pipeline information, to finally perform corresponding converting processes, out of the multiple conversion processes that performed initial conversion processes, and outputting inference information showing a result of the inference by performing inference processing including at least one of machine learning and data mining;
- generating image information for visualizing the relationship of the mutual connections between the multiple conversion processes, the relationship being shown by the pipeline information, and a relationship of a connection between the one or more final conversion processes and the inference process; and
- outputting the generated image information.

* * * * *